R. DRESSMANN.
TIRE TOOL.
APPLICATION FILED JAN. 24, 1918.

1,325,281.

Patented Dec. 16, 1919.

Inventor:
Robert Dressmann

By Allen & Allen
Attorneys.

UNITED STATES PATENT OFFICE.

ROBERT DRESSMANN, OF COVINGTON, KENTUCKY.

TIRE-TOOL.

1,325,281.  Specification of Letters Patent.  Patented Dec. 16, 1919.

Application filed January 24, 1918. Serial No. 213,462.

*To all whom it may concern:*

Be it known that I, ROBERT DRESSMANN, a citizen of the United States, and a resident of Covington, in the county of Kenton and State of Kentucky, have invented certain new and useful Improvements in Tire-Tools, of which the following is a full, clear, and exact description, reference being had to the accompanying drawing, forming part of this specification.

My invention relates to tools for use in removing the pneumatic tires from demountable rims of automobiles and the like.

The rims on many of the wheels in use with automobiles of today are made up in a single split section which is fitted with a tire and demountably secured over the felly of the vehicle wheel and is intended to be taken off in changing tires after a puncture or the like, and a fresh rim and tire complete inserted in its place.

It sometimes occurs, however, that the spare rims and tires become exhausted and the driver is called upon to insert a fresh inner tube in the casing of a tire when on the road. In such case, he will have to remove the tire from the rim and replace it thereon.

My new tool is for use in removing tires from rims under such conditions, although of course it is also well adapted to garage use, being quite compact and easily manipulated. The object of the tool is to contract a split rim, by pulling on the portions thereof to one side of the split so as to bend the one side inwardly.

This object and other advantages to be noted I accomplish by that certain construction and arrangement of parts to be hereinafter more specifically pointed out and claimed.

Figure 1:
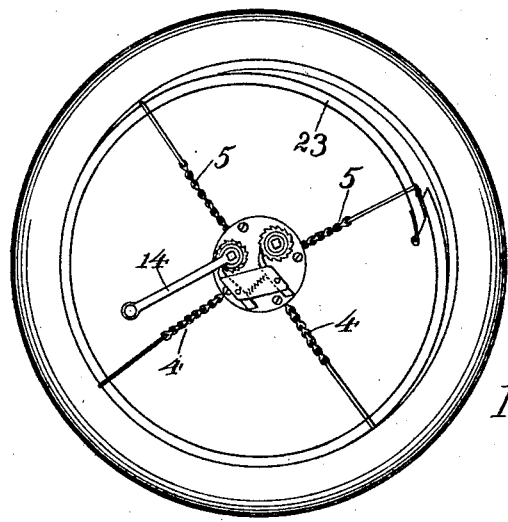
Figure 1 is a side elevation showing the device in use on a rim.
Figure 2:
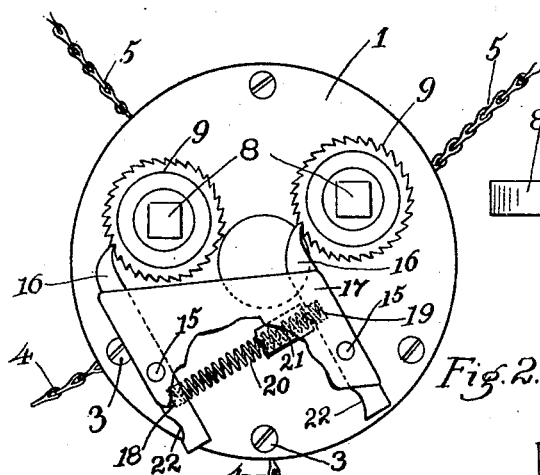
Fig. 2 is a top plan view of the device partly broken away.
Figure 3:
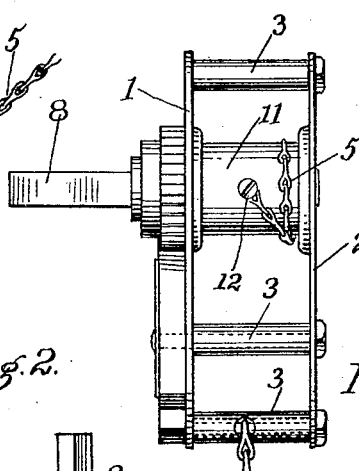
Fig. 3 is a side elevation of the device.
Figure 4:
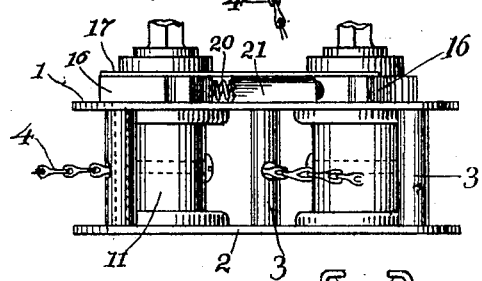
Fig. 4 is a side elevation from another point.
Figure 5:
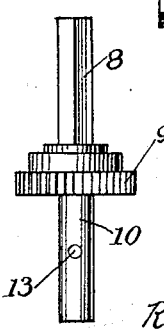
Fig. 5 is a detail side elevation of one of the revolving members on which the drums for the movable chains are mounted.
Figure 6:
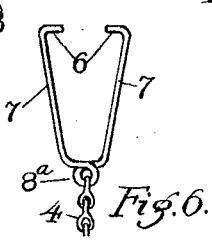
Fig. 6 is a side elevation of one of the hooks.

The device is made up of a top plate and a bottom plate 1 and 2, connected by posts 3, 3. Two of the posts have chains 4, 4, fixedly secured thereto, said chains carrying on their ends a special type of hook member for engaging the rim outside of the tire thereon.

These hooks are simply constructed from heavy wire bent at the ends to form claws 6, 6, thence converging together to form spring arms 7, 7, and formed in a ring $8^a$ at the crotch for purposes of attachment to the chain.

Two revoluble posts or members are provided having square ends 8, ratchet wheels 9 and pivot ends 10 which pass between the upper and lower plates of the device. Set over the pivot ends or posts 10 are the drums 11, which are held in place by screws or pins 12. The screws pass through holes 13 in the ends 10 of the revoluble members, and at one end engage the ends of chains 5, 5, to hold them to the drums. The drums prevent the revoluble members from falling out from between the upper and lower plates of the device, and by operating the members by means of a suitable crank 14 fitted to their square ends, the drums may be revolved, thereby drawing in on the chains.

The chains for the drums have like hooks to the fixed chains which engage the rim outside of the tire.

A simple pawl device is provided for the ratchet wheels. Mounted on posts 15, 15, on the upper plate of the device are the pawls 16, 16. The posts 15 likewise retain over the top of the main body of the pawls a cover plate 17. Each pawl is recessed, one at 18, and the other at 19, and a spring 20 is set between the pawls to engage in each recess. Over the spring is set a three-sided cover 21, which is held down by the cover plate 17.

Since the sockets 18 and 19 are set on opposite sides of the pivots of the respective pawls, both pawls will be spring-pressed toward engagement with the ratchets on the revoluble members.

To disengage the pawls, they are provided with a finger hold 22 which extends out from under the cover plate.

The device is preferably set with the two movable chains engaging the rim 23 to one side of the split therein (Fig. 1), one of the hooks being quite close. The easiest way to do this is to place the device near the center of the rim, with the hooks on the fixed chains engaging over the rim on each side, the pawls are then released and the two other chains are drawn out and the hooks engaged over the rim and the crank or other tool used to turn up the drums to draw in the two chains and thus to pull in the rim so that the split ends will pass each other and the diameter of the rim reduced so that the casing can be easily withdrawn. The pawls will hold the rim in this position until it is desired to put the repaired tire back in place, when the release of the pawls will allow the rim to spring back into place.

It seems plain that changes with regard to details of the above structure could readily be made without departing from the spirit of my invention therein, and I wish all merely mechanical changes to be included within the scope of my claim that follows where its language will permit of such interpretation.

Having thus described my invention, what I claim as new and desire to secure by Letters Patent, is:—

A rim contracting device comprising a body portion and a plurality of pairs of flexible strands having rim engaging extremities, one strand of each pair extending radially opposite to the other strand of such pair so that the strain of each strand is opposed directly by that of another, and means for winding one strand at least of each pair independently of the other pair.

ROBERT DRESSMANN.